(12) United States Patent
Shah et al.

(10) Patent No.: US 11,831,417 B2
(45) Date of Patent: Nov. 28, 2023

(54) THREAT MAPPING ENGINE

(71) Applicant: Focus IP Inc., Boise, ID (US)

(72) Inventors: Faisal Shah, Boise, ID (US); David Montz, Boise, ID (US)

(73) Assignee: Focus IP Inc., Boise, ID (US)

( * ) Notice: Subject to any disclaimer, the term of this patent is extended or adjusted under 35 U.S.C. 154(b) by 365 days.

(21) Appl. No.: 17/096,376

(22) Filed: Nov. 12, 2020

(65) Prior Publication Data

US 2022/0103577 A1    Mar. 31, 2022

Related U.S. Application Data

(60) Provisional application No. 63/084,246, filed on Sep. 28, 2020.

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC . H04L 9/3263; H04L 9/3213; H04L 63/1425; H04L 63/168
See application file for complete search history.

(56) References Cited

U.S. PATENT DOCUMENTS

| | | | | |
|---|---|---|---|---|
| 9,166,997 B1* | 10/2015 | Guo | | G06F 21/554 |
| 10,515,366 B1* | 12/2019 | Gorelik | | G06Q 20/4016 |
| 10,929,538 B2* | 2/2021 | Jiang | | G06F 21/57 |
| 11,238,095 B1* | 2/2022 | Burchard | | G06F 16/9024 |
| 2008/0036770 A1* | 2/2008 | Carter | | G06T 17/20 |
| | | | | 345/441 |
| 2013/0086677 A1* | 4/2013 | Ma | | G06F 21/50 |
| | | | | 726/22 |
| 2015/0161229 A1* | 6/2015 | Davies | | G06F 16/9024 |
| | | | | 707/737 |
| 2018/0351825 A1* | 12/2018 | Thomson | | H04W 40/02 |
| 2020/0193190 A1* | 6/2020 | Okada | | G05D 1/0246 |
| 2022/0374484 A1* | 11/2022 | Harris | | G06Q 20/40 |

* cited by examiner

*Primary Examiner* — Lynn D Feild
*Assistant Examiner* — Saad Ahmad Abdullah
(74) *Attorney, Agent, or Firm* — King Intellectual Asset Management

(57) ABSTRACT

Various embodiments provide novel tools and techniques for a threat mapping engine. A system includes a vertex discovery harvester subsystem, an edge extractor subsystem, a vertex correlator subsystem, and a recursive graph builder subsystem. The recursive graph builder subsystem includes a processor, and a computer readable medium in communication with the processor, the computer readable medium having encoded thereon a set of instructions executable by the processor to generate a map of one or more connections from the first known vertex to at least one related vertex of the one or more vertices via at least one edge, based on the one or more vertex correlations, determine a threat score indicative of a threat posed by at least one related vertex of the map, and generate a threat graph based on the map and the threat score of the at least one related vertex layered over the map.

21 Claims, 5 Drawing Sheets

THREAT MAPPING ENGINE

CROSS REFERENCE TO RELATED APPLICATIONS

This application claims priority to U.S. Provisional Patent Application Ser. No. 63/084,246, filed Sep. 28, 2020 by Faisal Shah et al., entitled "Threat Mapping Engine," the entire disclosure of which is incorporated herein by reference in its entirety for all purposes.

BACKGROUND

In today's digital environment, individuals, brands, and other entities can be targeted online through various methods as online platforms continue to evolve, and new platforms are created. Thus, a single bad actor can employ an ever increasing number of attack vectors on a target. In some cases, an interrelated network of bad actors may spread their presence across multiple platforms utilizing multiple vectors to target an individual product, person, or entity, or groups of products, people, and entities. These bad actors, through complex networks and multiple online presences, are often able to obfuscate their online presence, as well as their identities and relationships.

Conventional methods for responding to such threats include takedowns of individual known threats or groups of known threats. However, where one threat is taken down, another threat can almost immediately replace it. Furthermore, a takedown of only known threats fails to capture the entire scope of a bad actor's operations, and often a bad actor will operate multiple online presences of which several unknown threats will remain operational.

Thus, novel tools and techniques for threat-mapping are provided below.

BRIEF DESCRIPTION OF THE DRAWINGS

A further understanding of the nature and advantages of particular embodiments may be realized by reference to the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
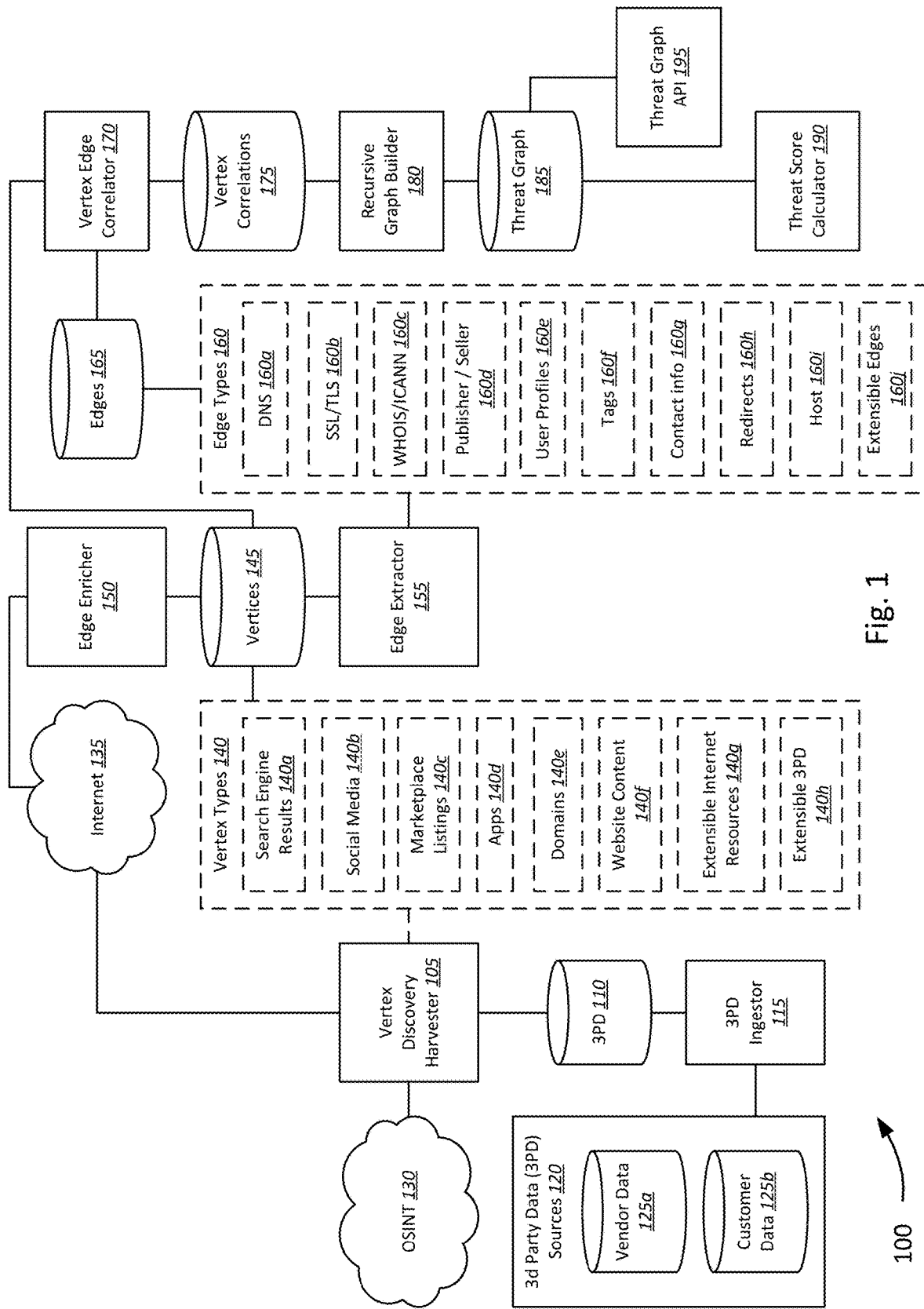
FIG. 1 is a schematic block diagram of a threat mapping system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system for a threat mapping engine, is provided. The system includes a vertex discovery harvester subsystem, edge extractor subsystem, vertex correlator subsystem, and a recursive graph builder subsystem. The vertex discovery harvester subsystem may be configured to discover one or more vertices from a public network. The edge extractor subsystem may be configured to extract edges from the one or more vertices, wherein the edges are extracted based on data contained within each respective vertex of the one or more vertices. The vertex correlator subsystem may be coupled to the vertex discovery harvester subsystem and edge extractor subsystem, and configured to determine one or more vertex correlations, wherein a vertex correlation is a correlation between a respective pair of the one or more vertices discovered by the vertex discovery harvester subsystem via one or more edges extracted by the edge extractor subsystem. The recursive graph builder subsystem may be coupled to the vertex correlator subsystem, and further comprise a processor, and a computer readable medium in communication with the processor, the computer readable medium having encoded thereon a set of instructions executable by the processor to perform the following operations. The recursive graph builder may be configured to obtain, via the vertex correlator, the one or more vertex correlations, receive, via a user interface, a selection of a first known vertex of the one or more vertices, and generate a map of one or more connections from the first known vertex to at least one related vertex of the one or more vertices via at least one edge, based on the one or more vertex correlations. The recursive graph builder may then determine a threat score indicative of a threat posed by at least one related vertex of the map, and generate a threat graph, wherein the threat graph includes the threat score of the at least one related vertex layered over the map.

In another aspect, an apparatus for the threat mapping engine is provided. The apparatus may include a processor, and a computer readable medium in communication with the processor, the computer readable medium having encoded thereon a set of instructions executable by the processor to perform the following operations. The apparatus may be configured to obtain, via a vertex discovery harvester subsystem, one or more vertices discovered from a public network, obtain, via an edge extractor subsystem, edges extracted from the one or more vertices, wherein the edges are extracted based on data contained within each respective vertex of the one or more vertices, and obtain, via a vertex correlator, one or more vertex correlations, wherein a vertex correlation is a correlation between a respective pair of vertices of the one or more vertices via one or more edges. The apparatus may further be configured to receive, via a user interface, a selection of a first known vertex of the one or more vertices, and generate a map of one or more connections from the first known vertex to at least one related vertex of the one or more vertices via at least one edge, based on the one or more vertex correlations. The apparatus may further determine a threat score indicative of a threat posed by at least one related vertex of the map, and generate a threat graph, wherein the threat graph includes the threat score of the at least one related vertex layered over the map.

In a further aspect, a method for the threat mapping engine is provided. The method includes obtaining, via a vertex discovery harvester subsystem, one or more vertices discovered from a public network, obtaining, via an edge extractor subsystem, edges extracted from the one or more vertices, wherein the edges are extracted based on data contained within each respective vertex of the one or more vertices, and obtaining, via a vertex correlator, one or more vertex correlations, wherein a vertex correlation is a correlation between a respective pair of vertices of the one or more vertices via one or more edges. The method may continue by receiving, via a user interface, a selection of a first known vertex of the one or more vertices, and generating a map of one or more connections from the first known vertex to at least one related vertex of the one or more vertices via at least one edge, based on the one or more vertex correlations. The method further includes determining a threat score indicative of a threat posed by at least one related vertex of the map, wherein the threat score is based, at least in part, on a total number of related vertices related to the first known vertex, and generating a threat graph, wherein the threat graph includes the threat score of the at least one related vertex layered over the map.

FIG. 1 illustrates a schematic block diagram of a threat mapping system 100, in accordance with various embodiments. The system 100 includes a vertex discovery harvester 105, third-party data (3PD) 110, 3PD ingestor 115, 3PD sources 120, vendor data 125a, customer data 125b, open source intelligence (OSINT) 130, Internet 135, vertex types 130, vertices 145, edge enricher 150, edge extractor 155, edge types 160, edges 165, vertex edge correlator 170, vertex correlations 175, recursive graph builder 180, threat graph 185, threat score calculator 190, and threat graph application programming interface (API) 195. It should be noted that the various components of the system 100 are schematically illustrated in FIG. 1, and that modifications to the system 100 may be possible in accordance with various embodiments.

In various embodiments, the vertex discovery harvester 105 may be coupled to 3PD 110, OSINT 130, and a public network such as the Internet 135. 3PD 110 may, in turn, be coupled to a 3PD ingestor 115, which is further coupled to 3PD sources 120. 3PD sources 120 may include vendor data 125a and customer data 125b. The vertex discovery harvester 105 may then generate vertices 145 which may include various vertex types 140. An edge enricher 150 may be coupled to a public network, such as the Internet 135, and further be coupled to vertices 145. Vertices 145 may be coupled to edge extractor 155, which may generate edges 165, which include edge types 160. Edges 165 may be coupled to vertex edge correlator 170, which produces vertex correlations 175, which may be coupled to recursive graph builder 180. The recursive graph builder 180 may generate a threat graph 185, which may further take input from a threat score calculator 190. The threat graph 185 may further be made available to client systems via a threat graph API 195.

In various embodiments, the system 100 may alternatively be referred to as a threat mapping engine (TME) 100. The TME 100 may include various subsystems and components as illustrated. In some examples, the TME 100 may include hardware, software, or hardware and software, both physical and/or virtualized. For example, in some embodiments, the TME 100 may include software which may be deployed in either a centralized and/or distributed configuration. Thus, TME 100 may further include hardware that is centralized and/or distributed. For example, in some embodiments, the TME 100 may include subsystems and components, such as the vertex harvester 105, 3PD ingestor 115, edge enricher 150, edge extractor 155, vertex edge correlator 170, recursive graph builder 180, threat score calculator 190, and threat graph API 195, each of which may deployed on the same and/or different machines. In various embodiments, different combinations of subsystems may be shared on the same machine, or alternatively, different subsystems may comprise separate hardware systems.

Accordingly, the vertex discovery harvester 105 may be a subsystem of the system 100, and may include software deployed across one or more hardware systems of the system 100. The vertex discovery harvester 105 subsystem may be configured to identify, or "discover," vertices to be used in the threat graph 185. Vertices may be discovered from publicly accessible sources, such as the Internet 135. In some embodiments, the vertex discovery harvester 105 may be configured to identify vertices based on information obtained from 3PD 110 and/or OSINT 130 (e.g., vertex criteria). Information obtained from 3PD 110 and/or OSINT 130 may include, for example, search criteria, keywords, search terms, known threat information (such as one or more usernames, domains, email addresses, marketplace listing, social media account, apps, website content such as images or videos, other internet resources, or other information about known threats). In some examples, the vertex discovery harvester 105 may perform a search based on the information obtained from 3PD 110 and/or OSINT 130. A search may be performed, for example, on one or more search engines, social media platforms, online marketplaces, app stores, and other web-based platforms. In some embodiments, the hypertext markup language (HTML) code of a webpage may be analyzed for the presence of data that matches the information obtained from 3PD 110 and/or OSINT 130. In some embodiments, analyzing HTML code may include searching for a string of characters that matches information from 3PD 110 and/or OSINT 130, such as email addresses, usernames, keywords, or other suitable information. In some embodiments, the vertex discovery harvester 105 may further search for content on webpages. This may include, for example, images, audio, and video content. In some embodiments, the vertex discovery harvester 105 may obtain the website content and perform analysis on the images, audio, and/or video content to identify website content that matches the information, in this case images, audio, and/or video content, obtained from 3PD 110 and/or OSINT 130. Suitable techniques for identifying matching website content may include, without limitation, digital fingerprinting, image matching/pixel matching, object recognition, audio matching, frame analysis and matching, and other suitable techniques.

The vertex discovery harvester 105 may, thus, be configured to identify vertices based on the various types of information from 3PD 110 and/or OSINT 130. Accordingly, information from the 3PD 110 and/or OSINT 130 may be specific to a known threat or a target of interest. In some embodiments, 3PD 110 utilized by the vertex discovery harvester 105 may be generated by 3PD ingestor 115, which further processes and identifies 3PD 110 for the vertex discovery harvester 105 from 3PD sources 120. In some embodiments, the 3PD ingestor 115 may include an external, client facing API through which raw 3PD from 3PD sources 120 may be provided to the 3PD ingestor 115, and specifically to the vertex discovery harvester 105. Accordingly, the API of the 3PD ingestor 115 may be configured to allow a client to invoke one or more functions for providing a client's 3PD data and/or any external 3PD extensibly to the system 100 (e.g., 3PD ingestor 115 and/or vertex discovery harvester 105. 3PD sources 120 may include, for example, vendor data 125*a* and customer data 125*b*. In some examples, vendor data 125*a* may include, for example, data obtained from commercial vendors. Thus, vendor data 125*a* includes data that is available commercially regarding threats and/or bad actors targeting an entity, e.g., a customer or other entity of interest. This data may, thus, include information regarding the known threats or bad actors, as described above. Similarly, customer data 125*b* may include data gathered by the customer. For example, customer data 125*b* may include data gathered during a security event, such as corporate indicator of compromise (IoC) data, indicator of attack (IoA) data, and the like. For example, IoC data may include forensic data gathered during an attack, security breach, or from malware. Thus, the 3PD ingestor 115 may further identify 3PD 110 that may be utilized by the vertex discovery harvester 105 from customer data 125*b* gathered from a security breach, attack, or other event. Similarly, in some embodiments, data obtained from OSINT 130 may be used by the vertex discovery harvester 105. For example, OSINT 130 may include publicly available information regarding known bad actors and/or threats.

Examples of 3PD 110 and/or OSINT 130 data may include data of various formats including, without limitation, OpenIoC, STIX, and TAXII. The data gathered may, in some examples, be processed to identify information relevant to a customer and/or other entity of interest. In further embodiments, threat information gathered via 3PD 110 and/or OSINT 130 may further be made available via the threat graph API 195, as described in greater detail below. Specifically, threat information from 3PD 110 and/or OSINT 130 may be layered into the threat graph 185 and/or a map generated by the recursive graph builder 180.

Accordingly, in various embodiments, 3PD 110 may be data storage and/or a storage system, such as a database and database server configured to store 3PD. Accordingly, 3PD ingestor 115 may take raw data (e.g., data from third-party sources, whether formatted or not) and processes the data into a normalized format, and stores the data in a centralized location, such as 3PD 110 to be used by vertex discovery harvester 105.

In various embodiments, the vertex discovery harvester 105 may be configured to harvest one or more vertices 145 as discovered in the publicly accessible source, such as the Internet 135. The Internet 135 may be considered an aggregate of all publicly accessible data available in disparate formats of raw entities, or "vertices," such as, but not limited to: domains, webpages, social profiles, apps, media streams or streaming media channels, search engine impressions, marketplace listings, DNS data such as zone files, a sales listings of a product, other website content, other public internet resources, among other suitable data associated with a respective entity Accordingly, the vertex discovery harvester 105 may further collect raw data from each vertex that is discovered such as, but not limited to: HTML, DNS, SSL, publisher/seller, or redirects.

The vertices 145 may include various types of vertices (e.g., vertex types 140) harvested by the vertex discovery harvester 105. Vertex types 140 may include, without limitation, search engine results 140*a*, social media accounts 140*b*, marketplace listings 140*c*, apps 140*d*, domains 140*e*, website content 140*f*, extensible internet resources 140*g*, and extensible 3PD 140*h*. Thus, a vertex harvested in vertices 145 may be an instance of a vertex type 140. In some embodiments, other types of internet resources may be harvested (e.g., an extensible internet resource 140*g* and extensible 3PD 140*h*) by the vertex discovery harvester 105. For example, other internet resources that have not been listed, from other platforms (e.g. other forms of content and/or online presence) or types of networks, e.g., on an anonymized network or the dark web (including any content, listing, webpage, user, etc.) may also be used as a vertex type. In further embodiments, the vertex discovery harvester 105 may be configured to further harvest vertex types 140 that have not yet been developed, or have recently been developed. Thus, extensible internet resources 140*g* and extensible 3PD 140*h* may further include other types of data which the vertex discovery harvester 105 may be adapted to harvest.

In various embodiments, edge enricher 150 may be configured to provide additional information to vertices 145 not obtained/provided by the vertex discovery harvester 105. Accordingly, the edge enricher 150 may be a subsystem of the TME 100 that further finds and supplements raw data of the vertices 145 harvested by the vertex discovery harvester 105. The edge enricher 150 may, accordingly, provide further data enrichment for edges that are not provided in a usable format from the raw data of the harvested vertices 145, such as, but not limited to: host provider information and WHOIS data, and any other publicly available edges that may be used to connect vertices. Accordingly, the edge enricher subsystem may, in some embodiments, be configured to obtain the further edge data from a source external to the raw data of the vertex harvest, such as from the Internet 135. In some examples, the edge enricher 150 may further be configured to obtain, for example, metadata regarding media content found on a webpage, related pages and information, related party information, and other data about the vertices 145 that may be used by edge extractor 155 to extract edges shared between vertices.

The discovered vertices may be stored in a pre-processing storage location for further processing downstream. Accordingly, like the 3PD 110, the vertices 145 may be data storage and/or a storage system, such as a database and database server configured to store the vertices harvested by the vertex discovery harvester. Accordingly, the vertex discovery harvester 105 and/or edge enricher 150 may be configured to convert raw data (e.g., data harvested in its original format and/or unformatted data) and processes the vertices into a normalized format stored in a centralized location, such as vertices 145 and made available to the edge enricher 150, edge extractor 155 and vertex edge correlator 170. Thus, in some embodiments, the vertex discovery harvester subsystem may refer to both the vertex discovery harvester 105 and the vertices 145 storage and/or storage system.

Accordingly, edge extractor 155 may be configured to extract edges 165 from the vertices 145. Edges 165 may include various types of edges (e.g., edge types 160) extracted by the edge extractor 155. Edge types 160 may include, without limitation, domain name system (DNS) 160a, secure sockets layer (SSL)/transport layer security (TLS) data 160b, WHOIS/ICANN data 160c, publisher/seller information 160d, user profiles 160e, tags 160f (e.g., Google® Analytics tag, other javascript tag that may be embedded in HTML code), contact information 160g, redirects 160h, host information 160i, and other extensible edges 160j. Thus, an edge that has been extracted in the edges 165 may be an instance of an edge type 160. In some embodiments, other types of internet resources may be extracted (e.g., extensible edges 160j) by the edge extractor 155. For example, other forms of edges that may be used to connect one or more vertices 165 may be extracted by the edge extractor 155, and thus comprise an extensible edge 160j. For example, an extensible edge 160j may comprise other parsed HTML details and other publicly available edges. In a further example, the extensible edge 160j may include a novel identifier across multiple platforms may connect one or more vertices of the vertices 145 (e.g., a link aggregator, etc.). In some further embodiments, the edge extractor 155 may configured to extract further edge types 160 that have not yet been developed, or have recently been developed. Thus, extensible edges 160j may further include other types of edges that the edge extractor may extensibly be configured to extract from the vertices 165.

As previously described with respect to the vertices 145, extracted edge details may be stored in a pre-processing storage location for further processing downstream. Like the 3PD 110 and vertices 145, the edges 165 may be data storage and/or a storage system, such as a database and database server, configured to store edges extracted by the edge extractor 155. As previously described, the edge extractor may be configured to convert raw data (e.g., data extracted from the vertices in its original format and/or unformatted data) and processes the edges into a normalized format stored in a centralized location to be made available to the vertex edge correlator 170. Thus, in some embodiments, the edge extractor subsystem may refer to the edge extractor 155 and the edges 165 storage and/or storage system.

In various embodiments, the vertex edge correlator 170 may be configured to correlate vertices 145 (e.g., one or more stored vertices) and edges 165 (e.g., one or more stored edges). Specifically, in some embodiments, the vertex edge correlator 170 may be configured to determine one-to-one correlations between vertices. For example, a one-to-one correlation may refer to a correlation between two vertices. In some embodiments, the one-to-one correlation may only include one-to-one correlations via a single edge. Thus, a connection between a first and second vertex via a first edge may be considered a separate one-to-one vertex correlation from a connection between the first and second vertex via a second edge. In other examples, a one-to-one correlation may include all edges shared between a pair of vertices. Thus, edges 165 may represent a shared relationship between two disparate vertices 145. In one example, a first vertex of the vertices 145 may be a first domain, and a second vertex of the vertices 145 may be a second domain. The first vertex and second vertex may share a first edge. The first edge may be a domain host 160i that is shared by both the first and second vertices. Thus, the vertex edge correlator 170 may correlate the first and second vertices via the first edge. In this way, the vertex edge correlator 170 may be configured to create one-to-one vertex correlations between each possible pair of vertices 145 and by each edge of the edges 165. It is to be understood that in other embodiments, different vertex types 140 may similarly be correlated by the vertex edge correlator 170. For example, a social media 140b profile may be correlated to a marketplace listing 140c via a user profile 160e. In other embodiments, other pairings of vertex types 140 may be possible. It is to be understood that any vertex type 140a-h may be correlated to any other vertex type 140a-h, or to a vertex of the same type 140, and the above examples should not be construed to limit possible correlations in any way. The vertex edge correlator 170 may, accordingly, produce a plurality of vertex correlations 175 between pairs of vertices 145, as described above.

As previously described, like the edges 165, vertices 145, and 3PD 110, the vertex correlations 175 may further comprise data storage and/or a storage system, such as a database and database server configured to store the vertex correlations produced by the vertex edge correlator 170. The vertex correlations 175 may then be provided, via the storage system, to the recursive graph builder 180. Thus, in some embodiments, the vertex correlator subsystem may refer to the vertex edge correlator 170 and vertex correlations 175 storage and/or storage system.

In various embodiments, the recursive graph builder 180 may be configured to generate a map (also referred to interchangeably as a "graph") of all or a subset of connections (e.g., edges 165) between each or a subset of the vertices 145. Accordingly, the recursive graph builder 180 may be a subsystem of the system 100 that recursively analyzes each vertex or a subset of vertices 145, following each edge 165, to generate a family of interrelated vertices. For example, in some embodiments, a "sizing" qualifier may be used to determine how many unique edges and vertices are used in a given map. In some embodiments, the sizing qualifier may be provided, for example, from a user/customer. In some embodiments, the map may be a traversable map inclusive of connections up to n-degrees of separation (e.g., "hops"). In some embodiments, the number of hops may further be configurable by a user and/or customer based on a respective sizing qualifier. The depth of the recursive processing is not limited in design, but rather configurable based on desired depth of analysis. Thus, in various embodiments, the vertices 145 may form the nodes of a threat graph (e.g., map), which may be connected by one or more edges 165. In some embodiments, the graph of related vertices may be built from a first known vertex, in which vertices related to the first known vertex are depicted along with the edged relating the first known vertex to each of the related vertices, respectively. In some embodiments, the first known vertex may be harvested directly from 3PD 110 and/or OSINT 130 (e.g., a known bad actor for which a customer may want to generate a threat graph). The graph of related vertices and their respective edges may then be stored as a threat graph 185, which may further comprise storage and/or a storage system.

In some embodiments, the recursive graph builder 180 may be configured to determine a score to indicate the quality of a map based on the reliability of all the known edges in the map. The quality of an edge may be defined by each unique edge type 160. For example an email address found in HTML may be less reliable than an email address found from WHOIS as there are very few verification points to add an email address to HTML relative to registering a domain name with a domain registrar and providing an administrative email address during the domain registration process. Accordingly, in some embodiments, the recursive graph builder 180 may further be configured to define a quality of a respective edge of a plurality of edges (e.g., edges 165). For example, in some embodiments, the quality of a respective edge may be indicated by the score. Thus, recursive graph builder 180 may be configured to generate a score for each of the respective edges of the edges 165.

In yet further embodiments, the recursive graph builder 180 may be configured to further generate threat qualifier data. Alternatively, in some embodiments, the recursive graph builder 180 may be coupled to a threat qualifier subsystem, which may be separate from the recursive graph builder 180. In yet further embodiments, threat qualifier information may be added/attributed to vertices 145 by the vertex discovery harvester 105. Accordingly, in various embodiments, threat qualifier information may be data points that are layered into vertices based on additional infringement activities from known enforcement activities across both open source and commercial security intelligence, such as OSINT 130 and/or 3PD 110. The threat qualifiers may be stored in the map generated by the recursive graph builder 180, such as threat graph 185. In some examples, threat qualifier information may be an additional attribute that is searchable in the threat graph 185, for example, via the threat graph API 195, as will be discussed in greater detail below. For example, in some embodiments, the threat qualifier may include a "known to be bad" attribute to distinguish small threats from large threats. For example, the known to be bad attribute may include the following three identifiers: enforced; suspected; and alerted.

The "enforced" identifier may represent the highest-risk known-to-be-bad attribute. In some embodiments, the "enforced" identifier may indicate that the node (e.g., vertex) is a bad actor, and enforcement action has already been taken against the node (e.g., vertex), or an enforcement action is in progress. As used herein, an enforcement action may include any action taken by an entity against the bad actor to suspend infringing activities. For example, and enforcement action may include, without limitation, a DMCA takedown request, a legal action, an injunction or order against the bad actor, or other takedown action. In some examples, the "enforced" identifier may further indicate that any connected vertices are also potentially bad nodes. In some embodiments, nodes connected to a vertex with the "enforced identifier" may automatically be given a known-to-be-bad attribute corresponding to increased risk, such as "suspected" or "enforced." The "suspected" identifier may represent a higher-risk known-to-be-bad attribute. In some embodiments, the "suspected" identifier may indicate that the node (e.g., vertex) is suspected to be a bad actor, and that the vertex has been or is currently under investigation, or that an enforcement action is pending. The "alerted" identifier may represent a lower-risk known-to-be-bad attribute. In some embodiments, an "alerted" identifier may indicate that the node (e.g., vertex) is a known entity and will be tracked and/or entered into a threat information database.

In various embodiments, a threat score calculator 190 may be coupled to the threat graph 185 storage, and configured to generate a threat score may be calculated based on a traversal of descendants (e.g., downstream connections) to indicate a threat posed by a given network of related vertices. For example, in some embodiments, a threat score may reflect a total number of related vertices in the map. In some embodiments, a threat score may vary for each child (e.g., downstream vertex) in the map based on an indicator of infringement, such as a threat qualifier as described above. In one example, a threat qualifier of "enforced" may have a higher threat score than a threat qualifier of "suspected," which in turn has a higher threat score than the "alerted" threat qualifier. For example, a vertex with an enforced threat qualifier may be given a threat score of 3, suspected a threat score of 2, and alerted a threat score of 1.

In the calculation of a threat score for the threat graph, a component threat score of a vertex may be determined and summed to produce an overall threat score for the threat graph. In some examples, the component threat score may be weighted based on the type of edge shared by a child vertex. For example, in some embodiments, the threat score calculator 190 may weight the threat score of the vertex based on the quality of the shared edge and/or edges, as determined by the recursive graph builder 180 above. For example, a higher quality edge may be weighted higher than a lower quality edge, as described above. Thus, threat score calculator 190 may be configured to generate a threat score that is weighted based on a quality and/or quantity of the respective edges shared by the vertex.

In further embodiments, a threat score of a vertex may be weighted based on the number of hops from a parent vertex (e.g., a first known vertex). For example, in some embodiments, a first-hop child vertex with a threat qualifier may be weighted to be greater than a second-hop child (e.g., grandchild) vertex with the same threat qualifier. In one example, a first-hop child vertex may be given full weight (e.g., 1.0× weighting), while a second-hop child vertex may be given half weight (e.g., 0.5× weighting). Further, downstream vertices may further be given reduced weight (e.g., 0.25×, 0.125×, etc.). In an alternative embodiment, the threat score may simply reflect the total number of children vertices with a threat qualifier indicating an increased likelihood of infringement.

Thus, the threat graph 185 may represent a map of interrelated vertices that may be traversed by an end-user, such as a customer, to understand how the vertices are related, and the threat posed by individual vertices and/or groups of vertices. Accordingly, in various embodiments, a threat graph API 195 may be provided as a client-facing point of consumption for the threat graph 185. In some examples, the threat graph API 185 may be configured to provide functionality to search, filter, and organize data presented by the threat graph 185. For example, as previously described, the threat graph API 185 may allow the client to indicate a sizing qualifier for the number vertices, edges, and/or hops. In further embodiments, the client may be able to search and/or filter, via the threat graph API 195, for specific vertex types 140, edge types 160, or combination of vertex types 140 and edge types 160. In yet further embodiments, the client may be able to able to filter via the threat graph API 185, based on threat qualifier and/or threat score, such that only vertices and connections that meet the filter criteria are displayed or pulled from the threat graph 185. The threat graph API 195 may, thus, be configured to allow the user to interact in various ways with the data of the threat graph 185 and/or to manipulate how the threat graph 185 is displayed by a client system.

Thus, in various embodiments, the TME 100 may be a system that creates a map (e.g., threat graph) of interrelated entities (e.g., vertices), publicly found on the internet by programmatically mining vertices for correlation points, or edges, and recursively matching them with similar edges found across all known vertices. This map creates a new data set that allows an end-user, such as a customer, to traverse a graph of related vertices to understand which vertices are related, in what previously were a disparate list of resources, detail as to how the vertices are related, and the concentration of each type of edge connection. This new data set created by TME gives the end user the intelligence as to how an organized operator may be deploying resources on the internet, across many digital channels, thus identifying networks or sole operators behind two or more vertices. Accordingly, the system 100 may include various subsystems configured to perform the various functions of the TME.

Accordingly, the system 100 may be designed to disambiguate a vast collection of publicly available data points found on the internet to create a clear and concise description of which data points are connected, how they are connected and who is responsible.

Figure 2:
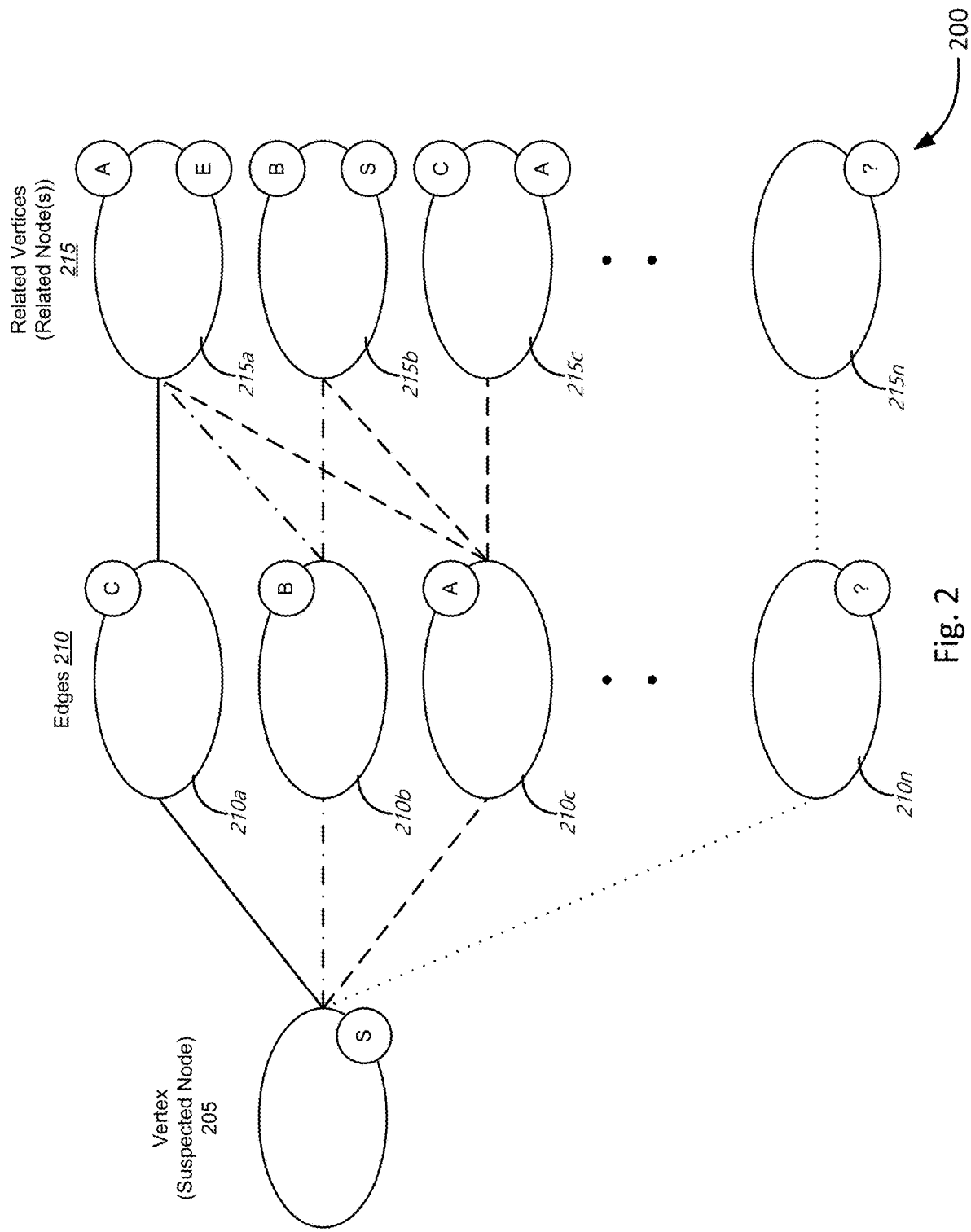
FIG. 2 is a schematic representation of a threat graph, in accordance with various embodiments.

FIG. 2 is a schematic representation of a threat graph 200, in accordance with various embodiments. The threat graph 200 includes a first known vertex, vertex 205, one or more edges 210*a*-210*n* (collectively "edges 210"), and one or more related vertices 215*a*-215*n* (collectively "related vertices 215"). It should be noted that the various components of the threat graph 200 are schematically illustrated in FIG. 2, and that modifications to the threat graph 200 may be possible in accordance with various embodiments.

In various embodiments, the first known vertex 205 may be coupled respectively, via the one or more edges 210*a*-210*n*, to one or more of the related vertices 215*a*-215*n*. For example, as depicted, the first known vertex 205 may be coupled, via the first edge 210*a*, to a first related vertex 215*a*. The first known vertex 205 may be coupled, via the second edge 210*b*, to the first related vertex 215*a*, and second related vertex 215*b*. The first known vertex 205 may be coupled, via the third edge 210*c*, to the first related vertex 215*a*, second related vertex 215*b*, and third related vertex 215*c*.

As discussed above with respect to FIG. 1, each of the vertices 205, 215 may be given a threat qualifier. In some embodiments, the threat qualifier may include a known-to-be-bad attribute. Thus, the threat graph 200 may be built from the first known vertex 205, to show relationships and underlying networks connected to the first known vertex 205. The first known vertex 205 may, accordingly, have a known-to-be-bad attribute of "suspected." The threat graph 200 may thus be configured to show the network of relationships for the "suspected" first known vertex 205.

Similarly, as discussed above with respect to FIG. 1, each of the edges 210 may include an edge score to indicate the quality and/or reliability of all the known edges. The edge score may include factors corresponding to, for example, the number of connections provided via the edge, and the quality of the edge (e.g., an email address extracted from HTML may be less reliable and have a lower score than an email address extracted from WHOIS data). For example, the first edge 210*a* may have a score "C," which is lower than a score of "B" or "A." The score may be reflective of the fact that the first edge 210*a* only provides a single connection to the first related vertex 215*a*. In other embodiments, alternative to letter scoring, the score may be a numerical value, in which a higher score corresponds to a higher quality and/or reliability edge. The second edge 215*b* may have a score "B," which is lower than "A," but higher than a "B" score. The second edge 215*b* connects the first known vertex 205 to two related vertices, the first related vertex 215*a* and the second related vertex 215*b*. The third edge 215*c* may have an "A" score. The first known vertex 205 may be connected, via the third edge 210*c*, to the first related vertex 215*a*, second related vertex 215*b*, and third related vertex 215*c*.

In various embodiments, the threat graph 200 may include a connection score indicating a quality and/or reliability of a connection to each respective related node 215. Similar to the edge score, a connection score may indicate a quality of connection, which may indicate a reliability of a connection from the first known vertex 205 to a related vertex 215. In some embodiments, the connection score may indicate quality based on various factors, which include, without limitation, a number of edges and/or connections between nodes, the quality of the edges (e.g., WHOIS data or other edge data that is scored higher than other edges), etc. The connection score may, therefore, account for both the number of edges between vertices, but also a quality of the individual edges (e.g., individual edge scores) of all connections between two vertices. In some embodiments, the connection score may thus be cumulative (e.g., additive) of all edge scores and/or the number of edges shared between two vertices. For example, the connection between the first known vertex 205 and the first related vertex 215*a* may have a connection score "A," that is higher than a score of "B" or "C." Like the edge score, the connection score may alternatively be represented as a numerical value, reflecting numerical scores for each component of a given connection. For example, the connection between the first known vertex 205 and first relative vertex 215 via the first edge 210*a* may have a first numerical score that is lower than a numerical score of the connection via the second edge 210*b*, and second edge 210*b* may have a lower numerical score than the connection via third edge 210*c*. However, the connection score may combine the scores for each of the individual edges 210*a*-210*c*.

The connection between the first known vertex 205 and the second related vertex 215*b* may, in turn, have a lower connection score than the connection between the first known vertex 205 an the first related vertex 215*a*. For example, the connection between the first known vertex 205 and the second related vertex 215*b* may include fewer edges linking the two vertices. For example, first known vertex 205 is connected to the second related vertex 215*b* via the second edge 210*b* and the third edge 210*c*, but not the first edge 210*a*. Thus, given the fewer number of connections, the connection score may be lower. However, in a contrasting example, a connection to an n-th related vertex 215*n* via an n-th edge 210*n* may have a higher edge score than the combined edges 210*a*-210*c*. Accordingly, the connection to the n-th related vertex 215*n* may have a higher connection score than a connection to the first related vertex 215*a*, which may have a greater number of edges in common, but lower scoring edges.

In various embodiments, the threat graph 200 may further include a threat score given to a known bad actor. For example, in some embodiments, a first set of one or more connections may be associated with a respective bad actor. Thus, the first set of one or more connections may include a network of connections from the first known vertex 205 to a respective set of one or more related vertices 215*a*-215*c*. A threat score may be assigned to the first set of one or more connections based on the identified bad actor. As previously described, the threat score may, for example, be based on the respective known-to-be bad attributes, information contained within edges 210, and/or information gathered from known threat databases, such as a local threat information database (e.g., private commercial database), and an external threat information database (e.g., a publicly available database). In yet further embodiments, threat information from a threat information database may be combined with connection score to provide threat score. For example, as previously described, the threat information may be used to determine a threat score or a known-to-be-bad attribute associated with the bad actor and/or a given vertex. Thus, the threat score may be based, at least in part, on a combination of the connection scores of each of the connections in the set of one or more connections, and the threat scores of each of the known related vertices 215 in the set of one or more connections. The threat scoring may be scaled and/or extrapolated to include networks of multiple sets of one or more connections. Thus, a threat graph may be generated, identifying a bad actor, networks of multiple bad actors, or networks of one or more vertices operated by one or more bad actors.

In yet further embodiments, as previously described with respect to FIG. 1, the threat score may be calculated based on a traversal of descendants (e.g., downstream connections) to indicate a threat posed by a given network of related vertices. For example, in some embodiments, a threat score may vary for each related vertex 215 (e.g., downstream vertex) based on a threat qualifier. In one example, a threat qualifier of "enforced" may have a higher threat score than a threat qualifier of "suspected," which in turn has a higher threat score than the "alerted" threat qualifier. For example, a vertex with an enforced threat qualifier may be given a threat score of 3, suspected a threat score of 2, and alerted a threat score of 1. In further embodiments, the threat score of a vertex may be weighted based on the type of edge 210 and/or the number of hops that a related vertex 215 is removed from a parent vertex (e.g., a first known vertex 205). For example, in some embodiments, a first-hop child vertex (e.g., related vertices 215) with a threat qualifier may be weighted to be greater than a second-hop child (e.g., grandchild) vertex (not shown) with the same threat qualifier.

Figure 3:
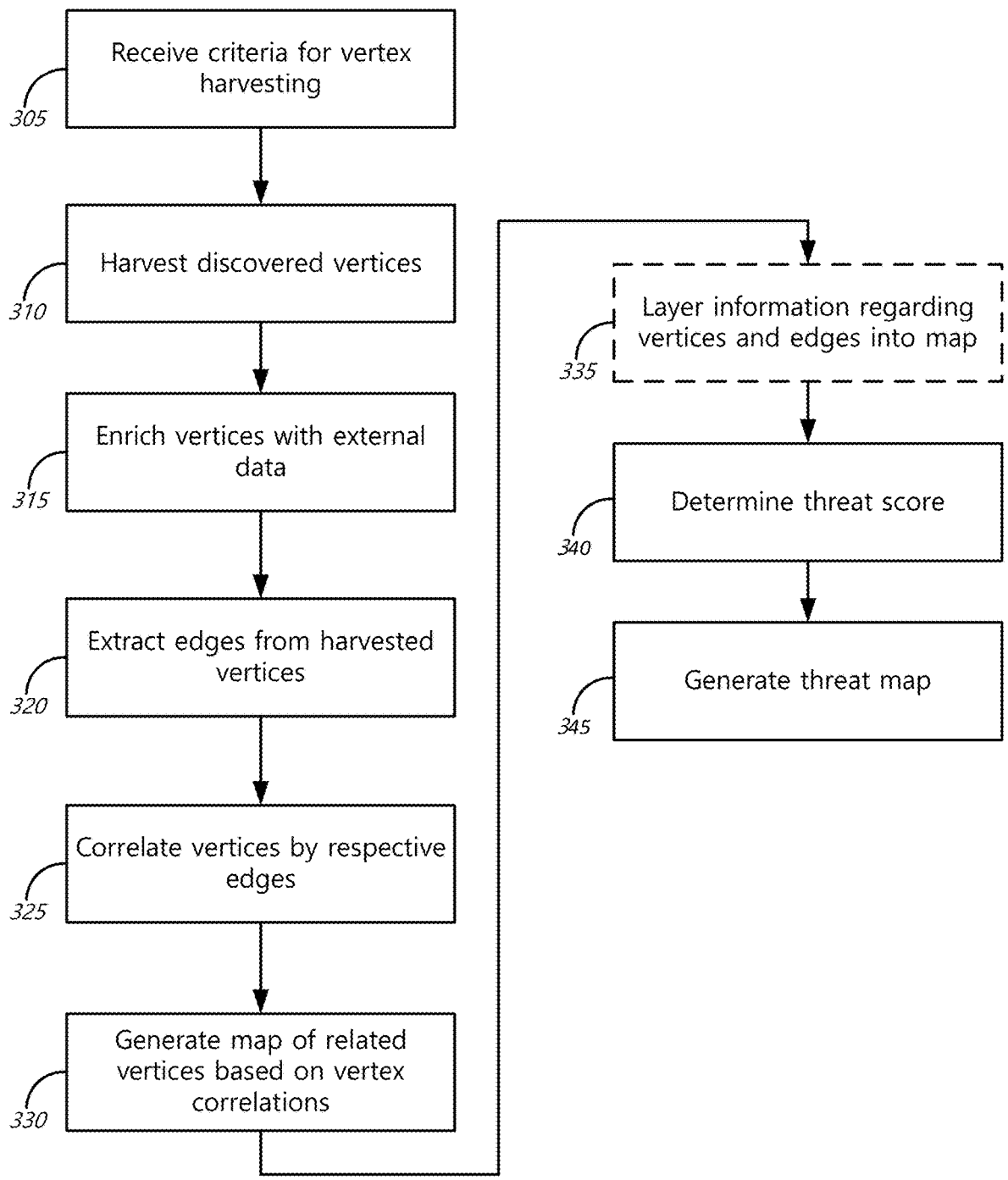
FIG. 3 illustrates a flow diagram of a method of operating a threat mapping engine, in accordance with various embodiments.

FIG. 3 illustrates a flow diagram of a method 300 for operating a threat mapping engine, in accordance with various embodiments. The method 300 begins, at block 305, by receiving criteria for vertex harvesting. The criteria for harvesting vertices may include, without limitation, a URL or other web address (e.g., IP address), a domain name, one or more keywords, a picture or other media content, or other suitable criteria for searching, identifying, and harvesting one or more vertices. In some embodiments, the criteria may be a first known vertex, as described above. As previously described with respect to FIG. 1, the criteria may be obtained, for example, from 3PD via a 3PD ingestor, such as customer data (including IoC/IoA data) and vendor data, and/or from OSINT.

Accordingly, the method 300 continues, at block 310, by harvesting one or more discovered vertices. As described above, a vertex discovery harvester subsystem may be configured to harvest the one or more vertices. As previously described, the one or more vertices may be discovered, via the vertex discovery harvester, from a publicly accessible source, such as the Internet. Discovered vertices may then be saved, for example, in pre-processing storage, as described above with respect to FIG. 1.

At block 315, the method 300 continues by enriching the harvested vertices with external data. As previously described with respect to FIG. 1, an edge enricher may be configured to enrich the vertices with data that cannot be extracted from the raw data of the vertices, as harvested by the vertex discovery harvester. The method 300 continues, at block 320, by extracting edges from the harvested vertices. As described above, an edge extractor subsystem may be configured to extract edges from the vertex harvest.

At block 325, the method 300 continues by correlating the vertices by the respective edges. Thus, as previously described, one or more vertex correlations may be determined by, for example, a vertex edge correlator. A vertex correlation may be a correlation relating a vertex to the one or more other vertices via one or more respective edges. As previously described, in one example, a vertex edge correlator may be configured to determine one-to-one correlations between vertices. For example, a one-to-one correlation may refer to a correlation between two vertices via a single edge and/or multiple edges. Thus, each edge may represent a shared relationship between two disparate vertices. Put another way, the vertex edge correlator may determine each pair of vertices related by each respective edge.

At block 330, a map of related vertices may be generated recursively, based on the vertex correlations. In some embodiments, a recursive graph builder subsystem may be configured to generate a graph (e.g., map) recursively relating one or more vertices via the one or more edges. In some examples, the graph may include all related vertices via each of the edges. In other embodiments, the graph may include a subset of the related vertices and/or a subset of the edges. In some embodiments, the vertices and/or edges built into the graph may be specified, for example, by a customer and/or end-user. As previously described, a sizing qualifier may be used to determine how many unique edges and vertices are used to build a given map. In some embodiments, the sizing qualifier may be received via a client facing API, such as a threat graph API. The sizing qualifier may further specify n-degrees of separation built into the map (e.g., the number of hops depicted in the map).

At block 335, information regarding the vertices and/or edges may be layered into the map. For example, as previously described, information regarding the vertices and/or edges may include scores (e.g., edge scores, reliability scores, etc.) and threat qualifiers (e.g., known-to-be-bad attribute, etc.). Thus, in various embodiments, the recursive graph builder may be configured to further layer score information, threat qualifier information, or other such information regarding the connections, vertices, and/or edges as described above. As previously described edge scores may be determined based on the type of edge. Threat qualifier information may be obtained for any identified bad actors. For example, in some embodiments, threat information may be obtained based on a specific edge (e.g., an email address and/or WHOIS information), or based on a vertex itself. In some further embodiments, one or more connections between one or more vertices (e.g., a network of vertices) may be associated with one or more entities. Threat information for each of the bad actors and/or entities may be obtained. As previously described, threat information may be obtained from an external, publicly available source, as well as from 3PD.

At block 340, a threat score may be determined. As previously described, in some embodiments, a threat score may be calculated based on a traversal of descendants (e.g., downstream connections) to indicate a threat posed by a given network of related vertices. In some embodiments, a threat score may reflect a total number of related vertices in the map. In further embodiments, the threat score may vary for each child (e.g., downstream vertex) in the map based on an indicator of infringement, such as a threat qualifier as described above. In further embodiments, a component threat score may be determined for each vertex of the map, and the threat score a determined as a sum of the component threat scores. In some embodiments, the component threat scores may be weighted according to a type of edge by which a related vertex is correlated to a first known vertex (e.g., a parent vertex), or an upstream vertex (in the case of multiple hops). In further embodiments, component threat scores may be weighted according to the number of hops removed a related vertex (e.g., child vertex, grandchild vertex) is from the first known vertex (e.g., parent vertex).

At block 345, a threat graph may be built, in which the threat score may be combined with the map of related vertices (e.g., the recursively generated graph), thus conveying the existing relationships between vertices, and any threat information for any of the vertices and/or edges, allowing a user to determine readily whether any entities in a network of connected vertices are bad actors, and to quickly assess a threat level (e.g., threat score) posed by a network of related vertices and/or an individual vertex.

Figure 4:
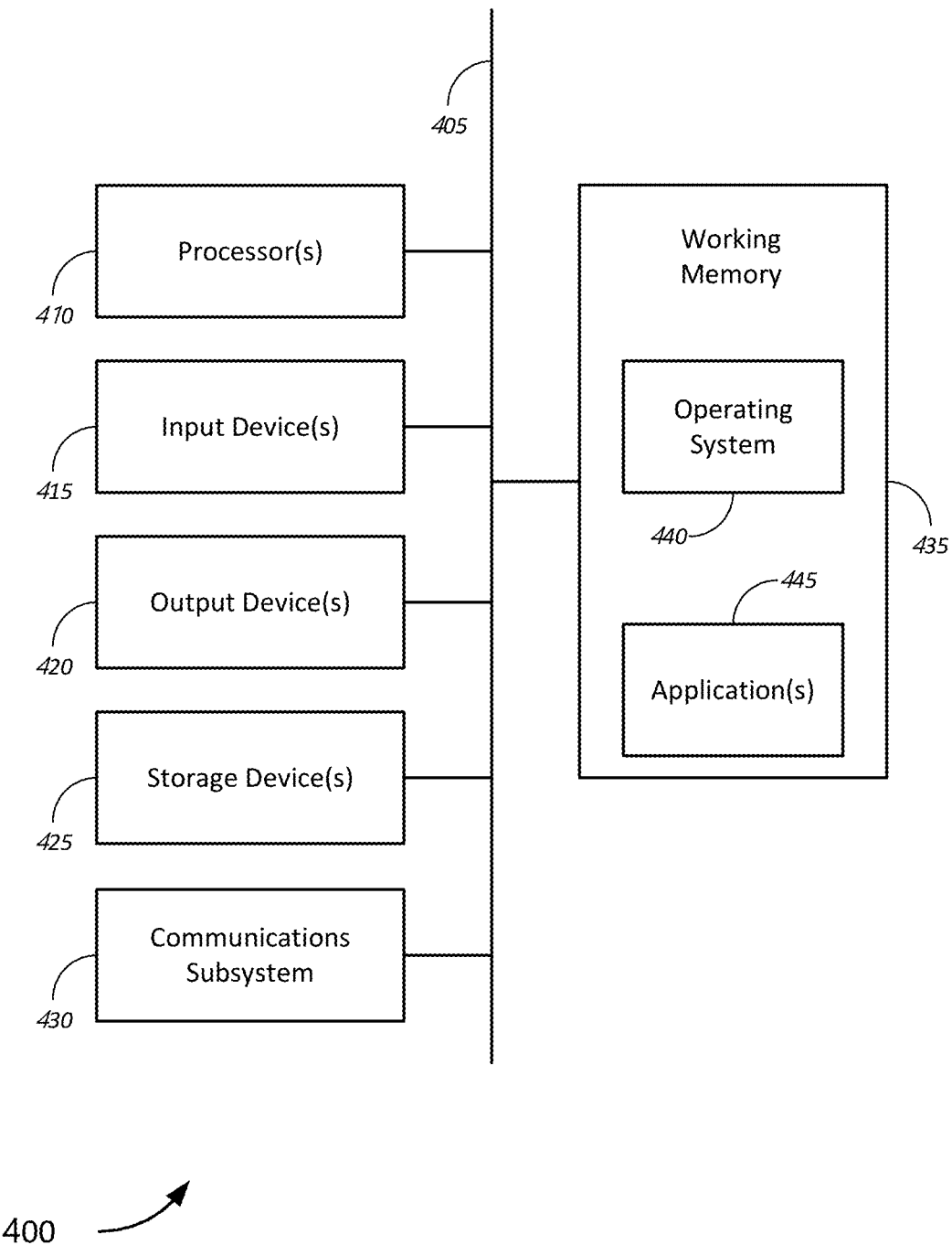
FIG. 4 is a schematic block diagram of a computer system for a threat mapping engine, in accordance with various embodiments.

FIG. 4 is a schematic block diagram of a computer system 400 for a threat mapping engine, in accordance with various embodiments. The computer system 400 is a schematic illustration of a computer system (physical and/or virtual), such as the TME system, or individual subsystems of the TME system, such as the vertex discovery harvester subsystem, vertex harvest storage and/or storage system, edge extractor subsystem, edge enricher subsystem, edge harvest storage and/or storage system, vertex correlator and related storage and/or storage system, recursive graph builder subsystem, threat score calculator, and threat graph storage and/or storage system, which may perform the methods provided by various other embodiments, as described herein. It should be noted that FIG. 4 only provides a generalized illustration of various components, of which one or more of each may be utilized as appropriate. FIG. 4, therefore, broadly illustrates how individual system elements may be implemented in a relatively separated or relatively more integrated manner. The computer system 400 includes multiple hardware (or virtualized) elements that may be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and microcontrollers); one or more input devices 415, which include, without limitation, a mouse, a keyboard, one or more sensors, and/or the like; and one or more output devices 420, which can include, without limitation, a display device, and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 400 may also include a communications subsystem 430, which may include, without limitation, a modem, a network card (wireless or wired), an IR communication device, a wireless communication device and/or chipset (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 430 may permit data to be exchanged with a network (such as the network described below, to name one example), with other computer or hardware systems, between data centers or different cloud platforms, and/or with any other devices described herein. In many embodiments, the computer system 400 further comprises a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 425 described above. In some cases, the storage medium may be incorporated within a computer system, such as the system 400. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 400 and/or may take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 400) to perform methods in accordance with various embodiments of the invention. According to a set of embodiments, some or all of the procedures of such methods are performed by the computer system 400 in response to processor 410 executing one or more sequences of one or more instructions (which may be incorporated into the operating system 440 and/or other code, such as an application program 445 or firmware) contained in the working memory 435. Such instructions may be read into the working memory 435 from another computer readable medium, such as one or more of the storage device(s) 425.

Merely by way of example, execution of the sequences of instructions contained in the working memory 435 may cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media may be involved in providing instructions/code to processor(s) 410 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 400. These signals, which may be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally receives the signals, and the bus 405 then may carry the signals (and/or the data, instructions, etc. carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
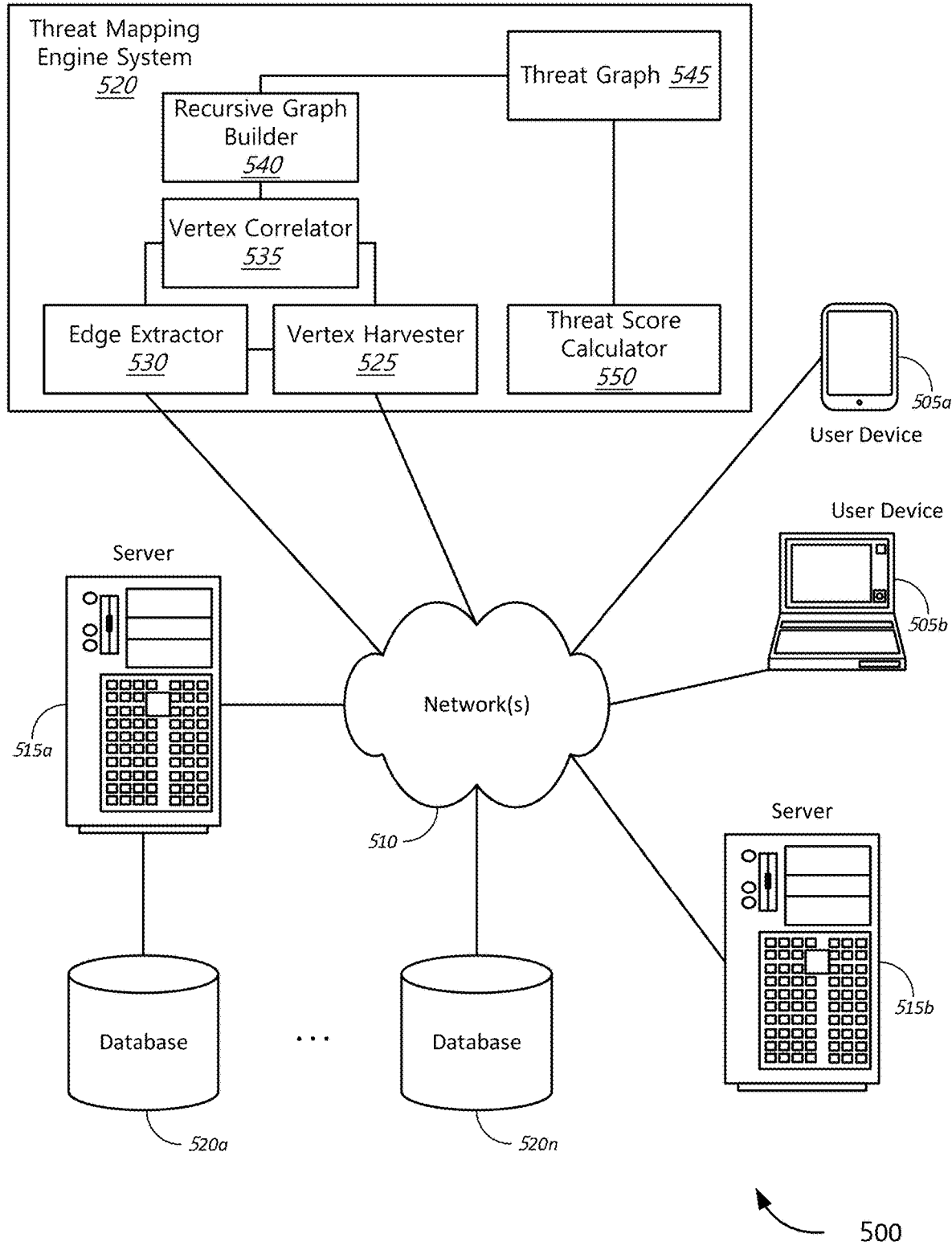
FIG. 5 is a schematic block diagram illustrating system of networked computer devices, in accordance with various embodiments.

FIG. 5 is a schematic block diagram illustrating system 500 of networked computer devices, in accordance with various embodiments. The system 500 may include one or more user devices 505. A user device 505 may include, merely by way of example, desktop computers, single-board computers, tablet computers, laptop computers, handheld computers, edge devices, wearable devices, and the like, running an appropriate operating system. User devices 505 may further include external devices, remote devices, servers, and/or workstation computers running any of a variety of operating systems. A user device 505 may also have any of a variety of applications, including one or more applications configured to perform methods provided by various embodiments, as well as one or more office applications, database client and/or server applications, and/or web browser applications. Alternatively, a user device 505 may include any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user devices 505*a*-505*b*, any number of user devices 505 may be supported.

Certain embodiments operate in a networked environment, which can include a network(s) 510. The network(s) 510 can be any type of network familiar to those skilled in the art that can support data communications, such as an access network, core network, or cloud network, and use any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP, Bluetooth, Zigbee/Z-wave, TCP/IP, SNA™, IPX™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, backbone network, cloud network, management network, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a data server, a web server, orchestration server, authentication server (e.g., TACACS, RADIUS, etc.), cloud computing device(s), or the like, as described above. The data server may include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, may include one or more application servers, which can be configured with one or more applications, programs, web-based services, or other network resources accessible by a client. Merely by way of example, the server(s) 515 can be one or more general purpose computers capable of executing programs or scripts in response to the user computers 505 and/or other servers 515, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a may reside on a storage medium local to (and/or resident in) a server 515a (or alternatively, user device 505). Alternatively, a database 520n can be remote so long as it can be in communication (e.g., via the network 510) with one or more of these. In a particular set of embodiments, a database 520 can reside in a storage-area network ("SAN") familiar to those skilled in the art. In one set of embodiments, the database 520 may be a relational database configured to host one or more data lakes collected from various data sources. The databases 520 may include SQL, no-SQL, and/or hybrid databases, as known to those in the art. The database may be controlled and/or maintained by a database server.

The system 500 may further include a threat mapping engine system 520, which includes a vertex harvester subsystem 525, edge extractor subsystem 530, vertex correlator subsystem 535, recursive graph builder subsystem 540, threat information subsystem 540, threat graph 545, and threat score calculator 550. In various embodiments, the vertex harvester may be configured to discover and harvest one or more vertices based on vertex criteria obtained from 3PD and/or OSINT. The harvested vertices may be fed to the edge harvester 530 and vertex correlator 535. In some embodiments, the harvested vertices may first be enriched by an edge enricher before edges are extracted. The edge enricher may be configured to provide further data regarding the vertices that may not be extractable from the harvested raw vertex data. Thus, the edge enricher may provide further external data to be associated with the vertex. The edge extractor 530 may then extract the various edges from the harvested vertex data. The extracted edges may then be fed to a vertex correlator 535 with the harvested vertices. The vertex correlator 535 may be configured to correlate each of the respective vertices with each of the applicable edges. In some embodiments, the vertex correlator 535 may determine each of the one-to-one correlations between pairs of vertices for each respective edge, as previously described. The recursive graph builder 540 may be configured to generate a traversable tree (e.g., map) of the related vertices based on the vertex correlations generated by the vertex correlator 535. The recursive graph builder may further layer in information regarding edge scores, reliability scores for correlations, and/or threat qualifiers for the various vertices. The map may then be stored as a threat graph in threat graph storage 545, where threat score information may be layered into the threat graph via the threat score calculator 550. The threat score calculator 550 may thus assign a threat score for each of the vertices individually, to a subset of vertices of the threat graph 545, and/or to the threat graph 545 as a whole. The threat graph 545 may then be made available to end-users to interact and manipulate via a threat graph API (not shown).

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a vertex discovery harvester subsystem configured to discover one or more vertices from a public network;
an edge extractor subsystem configured to extract edges from the one or more vertices, wherein the edges are extracted based on data contained within each respective vertex of the one or more vertices;
a vertex correlator subsystem coupled to the vertex discovery harvester subsystem and edge extractor subsystem, the vertex correlator configured to determine one or more vertex correlations, wherein a vertex correlation is a correlation between a respective pair of the one or more vertices discovered by the vertex discovery harvester subsystem via a first set of one or more edges extracted by the edge extractor subsystem;
a recursive graph builder subsystem coupled to the vertex correlator subsystem, wherein the recursive graph builder subsystem comprises:
a processor; and
a computer readable medium in communication with the processor, the computer readable medium having encoded thereon a set of instructions executable by the processor to:
obtain, via the vertex correlator, the one or more vertex correlations;
obtain threat information regarding the one or more vertices from at least one of a public threat information database and private threat information database;
generate a threat qualifier for each of the one or more vertices based on the threat information, wherein the threat qualifier is indicative of known infringement activity or enforcement activity related to a respective entity associated with a respective vertex of the one or more vertices, and wherein the threat qualifier includes a known-to-be-bad attribute indicating an identifier for each respective vertex enforced, suspected, or alerted;
receive, via a user interface, a selection of a first known vertex of the one or more vertices;
generate a map of one or more connections from the first known vertex to at least one related vertex of the one or more vertices via a second set of one or more edges, based on the one or more vertex correlations, wherein at least one of the second set of one or more edges includes at least one of WHOIS information, email address, HTML details, contact information, a JavaScript tag, or host provider information;
generate a respective edge score for each of the second set of one or more edges, based, at least in part, on the number of vertices of the one or more vertices connected to the first known vertex via a respective edge of the second set of one or more edges, wherein the respective edge score is further based on a type of edge of the respective edge;
determine a threat score indicative of a threat posed by at least one related vertex of the map; and
generate a threat graph, wherein the threat graph includes the threat score of the at least one related vertex layered over the map.

2. The system of claim 1, further comprising an edge enricher subsystem configured to obtain external edge data from a source other than raw data of the one or more vertices, and combine the external edge data with the raw data of the one or more vertices, wherein the data contained within each respective vertex of the one or more vertices, from which the edge extractor extracts the edges, comprises the external edge data.

3. The system of claim 1, wherein the threat score is weighted based on the threat qualifier of the at least one related vertex.

4. The system of claim 1, wherein the threat score is based on a sum of one or more component threat scores, wherein the threat score is attributed to the threat graph as a whole, and wherein the one or more component threat scores are attributed to one or more respective related vertices of the map.

5. The system of claim 1, wherein the threat score is based, at least in part, on a total number of related vertices related to the first known vertex.

6. The system of claim 1, wherein the one or more vertices includes at least one of a search engine result, social media profile, marketplace listing, webpage, app, domain name server zone file, or website content.

7. The system of claim 1, wherein the known infringement activity or enforcement activity comprises known infringement or enforcement of intellectual property rights.

8. The system of claim 1, wherein the first set of one or more edges and the second set of one or more edges are the same set of one or more edges.

9. The system of claim 1, wherein the first set of one or more edges and the second set of one or more edges each comprise at least one edge in common.

10. An apparatus comprising:
a processor; and
a computer readable medium in communication with the processor, the computer readable medium having encoded thereon a set of instructions executable by the processor to:
obtain, via a vertex discovery harvester subsystem, one or more vertices discovered from a public network;
obtain, via an edge extractor subsystem, edges extracted from the one or more vertices, wherein the edges are extracted based on data contained within each respective vertex of the one or more vertices;
obtain, via a vertex correlator, one or more vertex correlations, wherein a vertex correlation is a correlation between a respective pair of vertices of the one or more vertices via a first set of one or more edges;
obtain threat information regarding the one or more vertices from at least one of a public threat information database and private threat information database;
generate a threat qualifier for each of the one or more vertices based on the threat information, wherein the threat qualifier is indicative of known infringement activity or enforcement activity related to a respective entity associated with a respective vertex of the one or more vertices, and wherein the threat qualifier includes a known-to-be-bad attribute indicating an identifier for each respective vertex enforced, suspected, or alerted;
receive, via a user interface, a selection of a first known vertex of the one or more vertices;
generate a map of one or more connections from the first known vertex to at least one related vertex of the one or more vertices via a second set of one or more edges, based on the one or more vertex correlations wherein at least one of the second set of one or more edges includes at least one of WHOIS information, email address, HTML details, contact information, a JavaScript tag, or host provider information;

generate a respective edge score for each of the second set of one or more edges based, at least in part, on the number of vertices of the one or more vertices connected to the first known vertex via a respective edge of the second set of one or more edges, wherein the respective edge score is further based on a type of edge of the respective edge;

determine a threat score indicative of a threat posed by at least one related vertex of the map; and generate a threat graph, wherein the threat graph includes the threat score of the at least one related vertex layered over the map.

11. The apparatus of claim 10, wherein the threat score is weighted based on the threat qualifier of the at least one related vertex.

12. The apparatus of claim 10, wherein the threat score is based on a sum of one or more component threat scores, wherein the threat score is attributed to the threat graph as a whole, and wherein the one or more component threat scores are attributed to one or more respective related vertices of the map.

13. The apparatus of claim 10, wherein the threat score is based, at least in part, on a total number of related vertices related to the first known vertex.

14. The apparatus of claim 10, wherein the known infringement activity or enforcement activity comprises known infringement or enforcement of intellectual property rights.

15. A method comprising:
obtaining, via a vertex discovery harvester subsystem, one or more vertices discovered from a public network;
obtaining, via an edge extractor subsystem, edges extracted from the one or more vertices, wherein the edges are extracted based on data contained within each respective vertex of the one or more vertices;
obtaining, via a vertex correlator, one or more vertex correlations, wherein a vertex correlation is a correlation between a respective pair of vertices of the one or more vertices via a first set of one or more edges;
obtaining threat information regarding the one or more vertices from at least one of a public threat information database and private threat information database;
generating a threat qualifier for each of the one or more vertices base on the threat information, wherein the threat qualifier is indicative of know infringement activity or enforcement activity related to a respective entity associated with a respective vertex of the one or more vertices, and wherein the threat qualifier includes a known-to-be-bad attribute indicating an identifier for each respective vertex enforced, suspected, or alerted;
receiving, via a user interface, a selection of a first known vertex of the one or more vertices;
generating a map of one or more connections from the first known vertex to at least one related vertex of the one or more vertices via a second set of one of the second set of one or more edges includes at least one of WHOIS information, email address, HTML details, contact information, a JavaScript tag, or host provider information;
determining a threat score indicative of a threat posed by at least one related vertex of the map, wherein the threat score is based, at least in part, on a total number of related vertices related to the first known vertex; and
generating a threat graph, wherein the threat graph includes the threat score of the at least one related vertex layered over the map.

16. The method of claim 15, wherein the known infringement activity or enforcement activity comprises known infringement or enforcement of intellectual property rights.

17. The method of claim 15, further comprising an edge enricher subsystem configured to obtain external edge data from a source other than raw data of the one or more vertices, and combine the external edge data with the raw data of the one or more vertices, wherein the data contained within each respective vertex of the one or more vertices, from which the edge extractor extracts the edges, comprises the external edge data.

18. The method of claim 15, wherein the threat score is weighted based on the threat qualifier of the at least one related vertex.

19. The method of claim 15, wherein the threat score is based on a sum of one or more component threat scores, wherein the threat score is attributed to the threat graph as a whole, and wherein the one or more component threat scores are attributed to one or more respective related vertices of the map.

20. The method of claim 15, wherein the threat score is based, at least in part, on a total number of related vertices related to the first known vertex.

21. The method of claim 15, wherein the one or more vertices includes at least one of a search engine result, social media profile, marketplace listing, webpage, app, domain name server zone file, or website content.

* * * * *